Dec. 8, 1925.  
R. R. BOWERS  
1,565,139  
HAY RETAINING DEVICE FOR HAYSTACKERS  
Filed Sept. 27, 1923
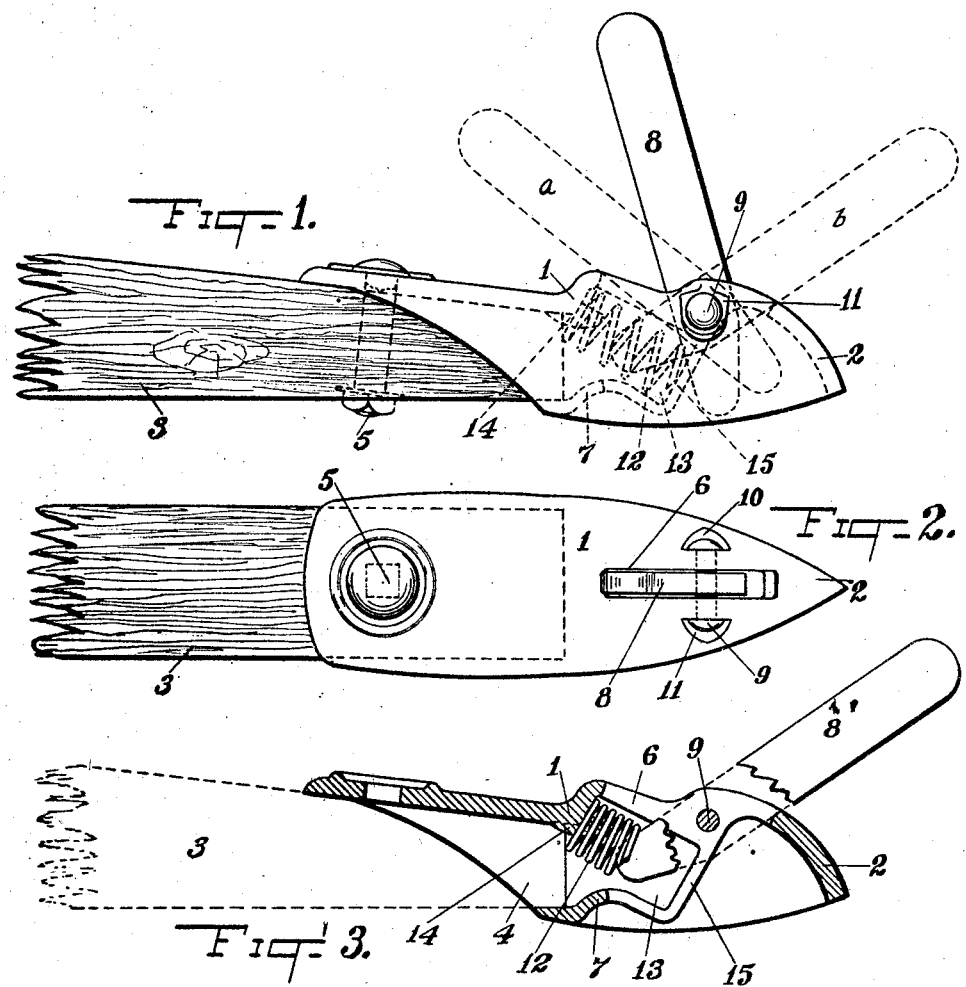
Witness;  
E. Wilderson
Inventor;  
ROBERT R. BOWERS  
by W. C. Jordinston  
Attorney Patented Dec. 8, 1925.

1,565,139

UNITED STATES PATENT OFFICE.

ROBERT R. BOWERS, OF BRANSON, COLORADO, ASSIGNOR TO DAIN MANUFACTURING COMPANY OF IOWA, OF OTTUMWA, IOWA, A CORPORATION OF IOWA.

HAY-RETAINING DEVICE FOR HAYSTACKERS.

Application filed September 27, 1923. Serial No. 665,159.

*To all whom it may concern:*

Be it known that I, ROBERT R. BOWERS, a citizen of the United States, residing at Branson, in the county of Las Animas and State of Colorado, have invented certain new and useful Improvements in Hay-Retaining Devices for Haystackers, of which the following is a specification, reference being had therein to the accompanying drawing.

My invention relates to hay stackers, and more particularly to the points of the stacker teeth and means employed to retain on the teeth hay delivered from a rake, and to hold it while the rake is being withdrawn.

The object of my invention is to provide a device operating automatically to yield to the forward pressure of the hay as the rake deposits it upon the stacker teeth, and adapted to yield in the opposite direction to prevent possible damage from the rake as it backs away from the stacker.

Referring to the drawings in which similar numerals indicate identical parts—

Figure 1 is a side view of the free end of a stacker tooth illustrating the application of my device and its normal position. Figure 2 is a plan view of Figure 1, and Figure 3 is a longitudinal vertical section of Figure 1 with the stacker tooth shown in dotted lines.

My device comprises a shell 1, formed preferably of malleable iron and having a convex point 2; the rear end of the stacker tooth 3 fits in a socket 4 in the shell 1 and is rigidly confined therein by a bolt 5. A slot 6 extends longitudinally, in the upper part of the shell 1, and in a web 7 integral with the shell 1 and extending interiorly from side to side thereof. A retaining finger 8 is pivotally mounted intermediate its ends within said slot, on a rivet or bolt 9, which is fastened in the walls of the shell 1, and has its heads buried in countersinks 10 and 11. A helical spring 12 operates in a pocket 13 formed by the walls of the shell 1 and the web 7, and is retained in place by a stud 14, about which one end of the spring is coiled, the opposite end of the spring contacting with the lower portion of the finger 8 below the pivot thereof when compressed by rocking motion of the finger 8, and when extended contacting with the portion 15 of the web 7 constituting the rear end of the pocket 13.

In the position of the finger 8, as shown in dotted lines at $a$ in Figure 1, the finger 8 is free from the spring 12, and rocks by gravity until stopped at 16 at the forward end of the slot 6; this is the normal position of the finger when hay is delivered on the stacker teeth. When the rake is withdrawn from beneath the hay it has deposited on the stacker teeth there may be sufficient drag upon the hay by the rake teeth to cause the finger 8 on the stacker teeth to assume the position shown in full lines in Figure 1, when the lower portion of the finger 8 is again in contact with the spring 12 the force of which is exerted against any further rearward swing of the finger and the hay is retained on the stacker teeth. In the event of any part of the rake catching upon the finger 8, as the rake is withdrawn, the finger 8 is rocked rearwardly, as shown at $b$ in dotted lines in Figure 1, and in full lines in Figure 3, the rearward movement being limited by the rearward closure of the slot 6, and at the instant of disengagement of the finger 8 and the rake the finger 8 returns to its hay retaining position by expansion of the spring 12, which has been compressed by the rearward movement of the finger 8, and by gravity after the spring 12 contacts with the part 15 of the web 7; it will be readily apparent that the finger 8 has a free movement from its point of contact with the forward closure of the slot 6, as shown in dotted lines at $a$ in Figure 1, to the position shown in full lines in the same figure, consequently it will rise freely and quickly by the drag of the hay, until in a vertical position.

I claim:

1. The combination of a hay stacker tooth having a hollow point, a hay retaining finger pivotally supported thereon having a free rocking movement for a limited distance and adapted to yield rearwardly beyond said distance by pressure, and a spring operating to return said finger to its freely movable position when the pressure is relieved.

2. The combination of a hay stacker tooth having a hollow point, a hay retaining finger pivotally supported intermediate its length on said point and having a free rocking movement for a limited distance and adapted to yield rearwardly beyond said distance by pressure, and a spring operating to return said finger to its freely rocking position when the pressure is relieved.

3. The combination of a hay stacker tooth having a hollow point, a slot in said point, a hay retaining finger pivotally supported intermediate its length in said point and extending through the slot, said finger having a free rocking movement in said slot for a limited distance and adapted to yield rearwardly beyond said distance by pressure, and a spring operating to return said finger to its free movable position when the pressure is relieved.

4. The combination of a hay stacker tooth having a hollow point, a hay retaining finger pivotally supported in said point and having a free rocking movement for a limited distance and adapted to yield rearwardly beyond said distance by pressure, and a spring in said point operating against the finger below the pivot thereof to return said finger to its free movable position when the pressure is relieved.

5. The combination of a hay stacker tooth having a hollow point, a slot in said point, a hay retaining finger pivotally supported intermediate its length in said point and extending upwardly through the slot, said finger having a free rocking movement in said slot for a limited distance and adapted to yield rearwardly beyond said distance by pressure, and a spring in said point operating against the finger below the pivot thereof to return said finger to its free movable position when said pressure is relieved.

6. A hay stacker tooth having a hollow point, a slot in said point, a hay retaining finger pivotally supported in said point and extending upwardly through the slot, said finger normally inclined forwardly freely movable to a substantially vertical position and adapted to incline rearwardly by pressure, and a spring in said point operating to return said finger to its freely movable position when the pressure is relieved.

ROBERT R. BOWERS.